United States Patent
Cheng et al.

(10) Patent No.: US 10,162,451 B2
(45) Date of Patent: Dec. 25, 2018

(54) DOUBLE-SIDED TOUCH CONTROL SUBSTRATE, DOUBLE-SIDED TOUCH CONTROL DEVICE AND DOUBLE-SIDED TOUCH CONTROL DISPLAY DEVICE

(71) Applicant: BOE TECHNOLOGY GROUP CO., LTD., Beijing (CN)

(72) Inventors: Hongfei Cheng, Beijing (CN); Yuxin Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 82 days.

(21) Appl. No.: 14/777,855

(22) PCT Filed: Jan. 20, 2015

(86) PCT No.: PCT/CN2015/071100
§ 371 (c)(1),
(2) Date: Sep. 17, 2015

(87) PCT Pub. No.: WO2016/045274
PCT Pub. Date: Mar. 31, 2016

(65) Prior Publication Data
US 2016/0299619 A1    Oct. 13, 2016

(30) Foreign Application Priority Data
Sep. 25, 2014   (CN) .......................... 2014 1 0498348

(51) Int. Cl.
*G06F 3/042* (2006.01)
*G06F 3/046* (2006.01)
(Continued)

(52) U.S. Cl.
CPC ............ *G06F 3/0416* (2013.01); *G06F 3/044* (2013.01); *G06F 3/0412* (2013.01)

(58) Field of Classification Search
CPC .... G06F 1/1616; G06F 3/0412; G06F 3/0488; G06F 1/1641; H04M 1/02; G07G 1/01
See application file for complete search history.

(56) References Cited

U.S. PATENT DOCUMENTS 9,317,197 B2 *  4/2016  Takuma .............. G06F 3/04883
9,703,476 B1 *  7/2017  Pappas ................ G06F 3/04847
(Continued)

FOREIGN PATENT DOCUMENTS

CN   101996031 A   3/2011
CN   102937852 A   2/2013
(Continued)

OTHER PUBLICATIONS

1st Office Action issued in Chinese application No. 201410498348.8 dated Jul. 30, 2015.
(Continued)

*Primary Examiner* — Lin Li
(74) *Attorney, Agent, or Firm* — Nath, Goldberg & Meyer; Joshua B. Goldberg

(57) ABSTRACT

The present invention provides a double-sided touch control substrate, a double-sided touch control device and a double-sided touch control display device. The double-sided touch control substrate comprises a base having a first side and a second side opposite to each other, a first touch control mechanism is provided on the first side, and a second touch control mechanism is provided on the second side. Both the first touch control mechanism and the second touch control mechanism are connected to a touch control driving unit through a switching mechanism, and the switching mechanism enables the first touch control mechanism and the second touch control mechanism to share the touch control driving unit in a time-sharing manner. With the double-sided touch control substrate, a streamlined touch-control device (Continued)

that is not limited to single-sided touch control is implemented by using fewer resources.

15 Claims, 2 Drawing Sheets

(51) Int. Cl.

| | | |
|---|---|---|
| G06F 3/047 | (2006.01) | |
| H04M 1/02 | (2006.01) | |
| G06F 3/041 | (2006.01) | |
| G06F 3/048 | (2013.01) | |
| G06F 1/16 | (2006.01) | |
| G06F 3/14 | (2006.01) | |
| G07G 1/01 | (2006.01) | |
| G06F 3/044 | (2006.01) | |

(56) References Cited

U.S. PATENT DOCUMENTS

| | | | |
|---|---|---|---|
| 2005/0104855 A1* | 5/2005 | Grossmeyer | G06F 1/1632 345/169 |
| 2006/0274036 A1* | 12/2006 | Hioki | G06F 3/0412 345/156 |
| 2008/0150903 A1* | 6/2008 | Chuang | G06F 1/1616 345/173 |
| 2008/0209357 A1* | 8/2008 | Vasta | A61M 1/16 715/771 |
| 2009/0073134 A1* | 3/2009 | Huang | G06F 3/041 345/173 |
| 2010/0171724 A1* | 7/2010 | Chang | G06F 3/0412 345/175 |
| 2010/0194705 A1* | 8/2010 | Kim | G06F 1/1626 345/173 |
| 2012/0162099 A1* | 6/2012 | Yoo | G06F 3/0412 345/173 |
| 2012/0254773 A1* | 10/2012 | Viswanathan | G06F 3/0483 715/753 |
| 2013/0032861 A1* | 2/2013 | Lee | G06F 3/047 257/254 |
| 2013/0109438 A1* | 5/2013 | Kwack | H04M 1/0214 455/566 |
| 2013/0162602 A1* | 6/2013 | Nakagawa | H01L 27/14601 345/175 |
| 2013/0181940 A1 | 7/2013 | Lai et al. | |
| 2014/0043284 A1* | 2/2014 | Park | G06F 3/044 345/174 |
| 2014/0071083 A1* | 3/2014 | Yoo | G06F 3/046 345/174 |
| 2014/0139458 A1 | 5/2014 | Premutico et al. | |
| 2014/0146248 A1* | 5/2014 | Wang | G06F 1/1641 349/12 |
| 2014/0195935 A1* | 7/2014 | Yokoyama | G06F 3/0488 715/761 |
| 2014/0218266 A1* | 8/2014 | Chen | G06F 3/1446 345/1.3 |
| 2014/0333546 A1* | 11/2014 | Chang | G06F 3/041 345/173 |
| 2015/0160775 A1* | 6/2015 | Chiashi | G06F 3/0488 345/173 |

FOREIGN PATENT DOCUMENTS

| | | | | |
|---|---|---|---|---|
| CN | 102955637 A | | 3/2013 | |
| CN | 103116233 A | | 5/2013 | |
| CN | 103677476 A | | 3/2014 | |
| CN | 103728755 A | | 4/2014 | |
| CN | 104281349 A | | 1/2015 | |
| KR | 1019990015681 | * | 4/1999 | G07G 1/01 |
| KR | 20000067673 | * | 11/2000 | G07G 1/01 |
| KR | 1020000067673 A | * | 11/2000 | G07G 1/01 |
| WO | WO 2014110567 A | * | 7/2014 | G06F 3/042 |

OTHER PUBLICATIONS

Form PCT/ISA/210 issued in International application No. PCT/CN2015/071100 dated Jan. 1, 2015.

* cited by examiner

DOUBLE-SIDED TOUCH CONTROL SUBSTRATE, DOUBLE-SIDED TOUCH CONTROL DEVICE AND DOUBLE-SIDED TOUCH CONTROL DISPLAY DEVICE

This is a National Phase Application filed under 35 U.S.C. 371 as a national stage of PCT/CN2015/071100, filed Jan. 20, 2015, an application claiming the benefit of Chinese Application No. 201410498348.8, filed Sep. 25, 2014, the content of each of which is hereby incorporated by reference in its entirety.

FIELD OF THE INVENTION

The present invention relates to the field of control technology, and particularly relates to a double-sided touch control substrate, a double-sided touch control device and a double-sided touch control display device.

BACKGROUND OF THE INVENTION

With the continuous development of science and technology, touch-control technology has been increasingly involved in people's lives, and especially, touch panels have been widely used in the field of display technology. A touch panel can provide simple, convenient and nature human-computer interaction mode, thereby providing a brand new multimedia human-computer interaction method for people, and especially greatly satisfying visual and audio enjoyment of people due to its advantages of rapid touch response, ability of multi-touch and the like.

At present, touch panels commonly used in the display field may be classified into add on mode touch panels, on cell touch panels and in cell touch panels according to the configurations thereof. An add on mode touch panel is a display device with touch function formed by attaching a touch panel and a display panel that are manufactured separately together. An on cell touch panel is a display device with touch function formed by arranging touch-control electrodes on the surface of a display panel directly. An in cell touch panel is a display device with touch function formed by embedding touch-control electrodes inside a display panel.

However, in the above-described add on mode touch panels, on cell touch panels and in cell touch panels in the prior art, sensing electrodes and driving electrodes provided in pairs and arranged on the same side are driven through an independent touch-control driving unit. In this way, single-sided touch-control can be easily implemented. However, in order to implement double-sided touch-control, it is necessary to provide one touch-control driving unit for each side implementing touch-control separately, which results in a cumbersome system and greatly increased cost of a touch control device.

Therefore, how to implement a streamlined touch-control device that is not limited to single-sided touch control has become a technical problem to be solved urgently.

SUMMARY OF THE INVENTION

The present invention aims to provide a double-sided touch control substrate, a double-sided touch control device and a double-sided touch control display device, in view of the above-described defect existing in the prior art. With the double-sided touch control substrate, a streamlined touch-control device that is not limited to single-sided touch control is implemented by using fewer resources, resource utilization rate is higher and cost of a touch control device is lower.

A technical solution employed to solve the above technical problem is a double-sided touch control substrate, comprising a base having a first side and a second side opposite to each other, wherein a first touch control mechanism is provided on the first side, a second touch control mechanism is provided on the second side, both the first touch control mechanism and the second touch control mechanism are connected to a touch control driving unit through a switching mechanism, and the switching mechanism enables the first touch control mechanism and the second touch control mechanism to share the touch control driving unit in a time-sharing manner.

Preferably, the touch control driving unit is provided with a sensing signal line and a driving signal line.

Preferably, the first touch control mechanism comprises a first sensing electrode and a first driving electrode, and the second touch control mechanism comprises a second sensing electrode and a second driving electrode.

Preferably, the switching mechanism comprises:

a first change-over switch, which is connected to the sensing signal line, the first sensing electrode and the second sensing electrode and is configured to switch between the first sensing electrode and the second sensing electrode to connect the first sensing electrode or the second sensing electrode to the sensing signal line; and a second change-over switch, which is connected to the driving signal line, the first driving electrode and the second driving electrode and is configured to switch between the first driving electrode and the second driving electrode to connect the first driving electrode or the second driving electrode to the driving signal line.

Preferably, the touch control driving unit is provided with a plurality of the sensing signal lines and a plurality of the driving signal lines, the switching mechanism comprises a plurality of the first change-over switches and a plurality of the second change-over switches, the first touch control mechanism comprises a plurality of the first sensing electrodes and a plurality of the first driving electrodes, the second touch control mechanism comprises a plurality of the second sensing electrodes and a plurality of the second driving electrodes, the first change-over switches are provided correspondingly to the sensing signal lines, the first sensing electrodes and the second sensing electrodes, and the second change-over switches are provided correspondingly to the driving signal lines, the first driving electrodes and the second driving electrodes; and each first change-over switch is connected to the corresponding sensing signal line, and is configured to switch between the corresponding first sensing electrode and the corresponding second sensing electrode to connect the corresponding first or second sensing electrode to the corresponding sensing signal line; each second change-over switch is connected to the corresponding driving signal line, and is configured to switch between the corresponding first driving electrode and the corresponding second driving electrode to connect the corresponding first or second driving electrode to the corresponding driving signal line.

Preferably, the first sensing electrodes and the first driving electrodes are in the shape of stripe or rhombus, and are arranged perpendicular to and intersecting with each other; correspondingly, the second sensing electrodes and the second driving electrodes are in the shape of stripe and rhombus, and are arranged perpendicular to and intersecting with each other.

Optionally, the first sensing electrodes and the first driving electrodes are in the shape of rhombus, both the first sensing electrodes and the first driving electrodes are arranged in arrays, columns of the array formed by the first sensing electrodes and rows of the array formed by the first driving electrodes are perpendicular to and intersecting with each other; the second sensing electrodes and the second driving electrodes are in the shape of rhombus, both the second sensing electrodes and the second driving electrodes are arranged in arrays, columns of the array formed by the second sensing electrodes and rows of the array formed by the second driving electrodes are perpendicular to and intersecting with each other.

Preferably, in the first touch control mechanism, the first sensing electrodes and the first driving electrodes are both arranged inside the first side; or the first sensing electrodes and the first driving electrodes are both arranged outside the first side; or the first sensing electrodes are arranged outside the first side, while the first driving electrodes are arranged inside the first side; and in the second touch control mechanism, the second sensing electrodes and the second driving electrodes are both arranged inside the second side; or the second sensing electrodes and the second driving electrodes are both arranged outside the second side; or the second sensing electrodes are arranged outside the second side, while the second driving electrodes are arranged inside the second side.

Preferably, length of touch control time for the first sensing electrodes and the first driving electrodes is the same as that for the second sensing electrodes and the second driving electrodes.

There is provided a double-sided touch control device, comprising the above-described double-sided touch control substrate.

There is provides a double-sided touch control display device, comprising the above-described double-sided touch control substrate.

Preferably, the base is a liquid crystal panel, an organic light-emitting diode display panel, a double-sided display panel, a transparent display panel, a flexible display panel or a non-flexible display panel.

Preferably, the length of touch control time for the first sensing electrodes and the first driving electrodes is smaller than length of display time for the first side, and the sum of the length of touch control time and the length of display time is equal to a frame period; and/or, the length of touch control time for the second sensing electrodes and the second driving electrodes is smaller than length of display time for the second side, and the sum of the length of touch control time and the length of display time is equal to the frame period.

The beneficial effects of the present invention are as follows: in the double-sided touch control substrate, first sensing and driving electrodes are provided at one side of the base and second sensing and driving electrodes are provided at the other side of the base, switching between connections of the first sensing electrodes and the second sensing electrodes to the sensing signal lines Rx is implemented by the first change-over switches, switching between connections of the first driving electrodes and the second driving electrodes to the driving signal lines Tx is implemented by the second change-over switches, thereby achieving the function of double-sided touch control; as the function of double-sided touch control is achieved by sharing one touch control driving unit (or driving IC), a streamlined touch-control device that is not limited to single-sided touch control is implemented by using fewer resources, and thus resource utilization rate is higher and cost of a touch control device is lower.

DETAILED DESCRIPTION OF THE EMBODIMENTS

To enable a person skilled in the art to understand the technical solutions of the present invention better, the double-sided touch control substrate, double-sided touch control device and double-sided touch control display device of the present invention are further described in detail below in conjunction with the accompanying drawings and specific implementations.

Embodiment 1

This embodiment provides a double-sided touch control substrate, which can be applied in various occasions with control needs in daily life, such as image control of a display panel having display function, building control that can be respectively controlled indoors or outdoors, temperature control for room heating and embedded in a common wall of adjacent rooms at home, or the like, thereby achieving resource sharing and convenient operation.

A double-sided touch control substrate comprises a base having a first side and a second side provided opposite to each other, a first touch control mechanism is provided on the first side, and a second touch control mechanism is provided on the second side. Both the first touch control mechanism and the second touch control mechanism are connected to a touch control driving unit through a switching mechanism, and the switching mechanism enables the first touch control mechanism and the second touch control mechanism to share the touch control driving unit in a time-sharing manner. In the double-sided touch control substrate, by setting two touch control mechanisms that are able to implement touch control function separately to share one touch control driving unit, a streamlined touch-control device that is not limited to single-sided touch control is implemented by using fewer resources.

Figure 1:
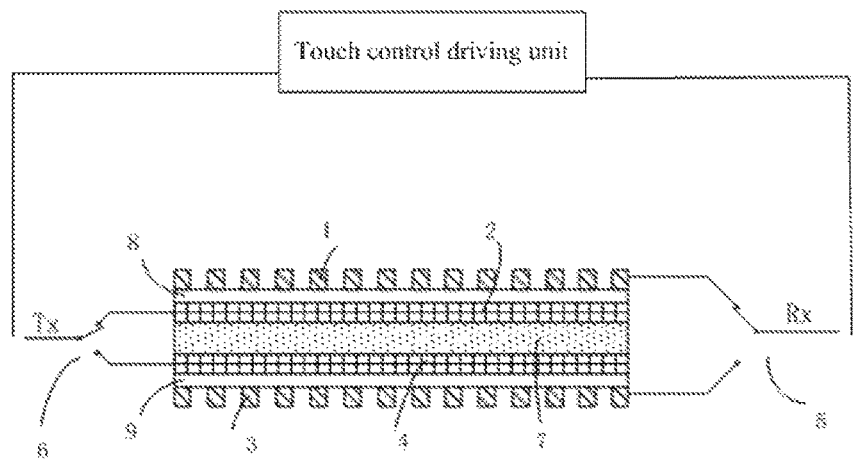
FIG. 1 is a cross-sectional view of a double-sided touch control substrate according to Embodiment 1 of the present invention.

As shown in FIG. 1, the touch control driving unit is provided with a sensing signal line Rx and a driving signal line Tx, and the switching mechanism comprises a first change-over switch 5 connected to the sensing signal line Rx and a second change-over switch 6 connected to the driving signal line Tx. The first change-over switch 5 is configured to switch between a first sensing electrode 1 and a second sensing electrode 3 to connect the first sensing electrode 1 or the second sensing electrode 3 to the sensing signal line Rx, i.e., the connections of the first sensing electrodes 1 and the second sensing electrode 3 to the sensing signal line Rx are controlled through the first change-over switch 5; similarly, the second change-over switch 6 is configured to switch between a first driving electrode 2 and a second driving electrode 4 to connect the first driving electrode 2 or the second driving electrode 4 to the driving signal line Tx, i.e., the connections of the first driving electrodes 2 and the second driving electrode 4 to the driving signal line Tx are controlled through the second change-over switch 6. The sensing signal line Rx and the driving signal line Tx may be provided in one touch control driving unit, and therefore, with one touch control driving unit, the function of double-sided touch control can be achieved through the first change-over switch 5 and the second change-over switch 6.

Specifically, as shown in FIG. 1, the first touch control mechanism includes a first sensing electrode 1 and a first driving electrode 2, and the second touch control mechanism includes a second sensing electrode 2 and a second driving electrode 4. The first change-over switch 5 is connected to the touch control driving unit through the sensing signal line Rx, and the second change-over switch 6 is connected to the touch control driving unit through the driving signal line Tx. In addition, the first sensing electrode 1 and the second sensing electrode 3 are connected to the first change-over switch 5, respectively, and the first change-over switch 5 is configured to switch between the first sensing electrode 1 and the second sensing electrode 3 to connect the first sensing electrode 1 or the second sensing electrode 3 to the sensing signal line Rx; the first driving electrode 2 and the second driving electrode 4 are connected to the second change-over switch 6, respectively, and the second change-over switch is configured to switch between the first driving electrode 2 and the second driving electrode 4 to connect the first driving electrode 2 or the second driving electrode 4 to the driving signal line Tx. Thus, the function of time-sharing touch control of the touch control mechanisms arranged at different sides is achieved through switch of the change-over switches.

The touch control mechanism is in the manner of capacitive touch control, as shown in FIG. 1, a first insulating layer 8 is provided between the first sensing electrode 1 and the first driving electrode 2, so as to allow the first sensing electrode 1 and the first driving electrode 2 to be electronically insulated from each other and form opposite plates of a sensing capacitor; a second insulating layer 9 is provided between the second sensing electrode 3 and the second driving electrode 4, so as to allow the second sensing electrode 3 and the second driving electrode 4 to be electronically insulated from each other and form opposite plates of a sensing capacitor.

The numbers of the first sensing electrodes 1, the second sensing electrodes 2, the first driving electrodes 3 and the second driving electrodes 4 may be set according to touch-control accuracy, and are not specifically limited in the present invention. To guarantee touch control accuracy, it is necessary to provide a plurality of the sensing signal lines (Rx1, Rx2, . . . , Rxn) and a plurality of the driving signal lines (Tx1, Tx2, . . . , Txn). Accordingly, the switching mechanism comprises a plurality of the first change-over switches 5 and a plurality of the second change-over switches 6. The first touch control mechanism comprises a plurality of the first sensing electrodes 1 and a plurality of the first driving electrodes 2 intersecting with each other, and the second touch control mechanism comprises a plurality of the second sensing electrodes 3 and a plurality of the second driving electrodes 4 intersecting with each other. The first change-over switches 5 are provided correspondingly to the sensing signal lines Rx, the first sensing electrodes 1 and the second sensing electrodes 3, and the second change-over switches 6 are provided correspondingly to the driving signal lines Tx, the first driving electrodes 2 and the second driving electrodes 4. Each first change-over switch 5 is connected to the corresponding sensing signal line Rx (e.g., Rx1, Rx2, . . . , or Rxn in FIG. 2), and is configured to switch between the corresponding first sensing electrode 1 and the corresponding second sensing electrode 3 to connect the corresponding first or second sensing electrode 1 or 3 to the corresponding sensing signal line Rx; each second change-over switch 6 is connected to the corresponding driving signal line Tx (e.g., Tx1, Tx2, . . . , or Txn in FIG. 2), and is configured to switch between the corresponding first driving electrode 2 and the corresponding second driving electrode 4 to connect the corresponding first or second driving electrode 2 or 4 to the corresponding driving signal line Tx.

That is, in this embodiment, each first change-over switch 5 or second change-over switch 6 is equivalent to one single-pole double-throw switch. For each first change-over switch 5, the corresponding sensing signal line Rx is connected to the common terminal of the single-pole double-throw switch, and the corresponding first sensing electrode 1 and second sensing electrode 3 are connected to the two control terminal of the single-pole double-throw switch, respectively, so that the corresponding first sensing electrode 1 or the second sensing electrode 3 is connected to the corresponding sensing signal line Rx through switching of the first change-over switch 5. For each second change-over switch 6, the corresponding driving signal line Tx is connected to the common terminal of the single-pole double-throw switch, and the corresponding first driving electrode 2 and second driving electrode 4 are connected to the two control terminal of the single-pole double-throw switch, respectively, so that the corresponding first driving electrode 2 or the second driving electrode 4 is connected to the corresponding driving signal line Tx through switching of the second change-over switch 6. Therefore, alternative use of touch control function of the first side and the second side can be easily implemented through switching of the first change-over switches 5 and the second change-over switches 6.

Figure 2:
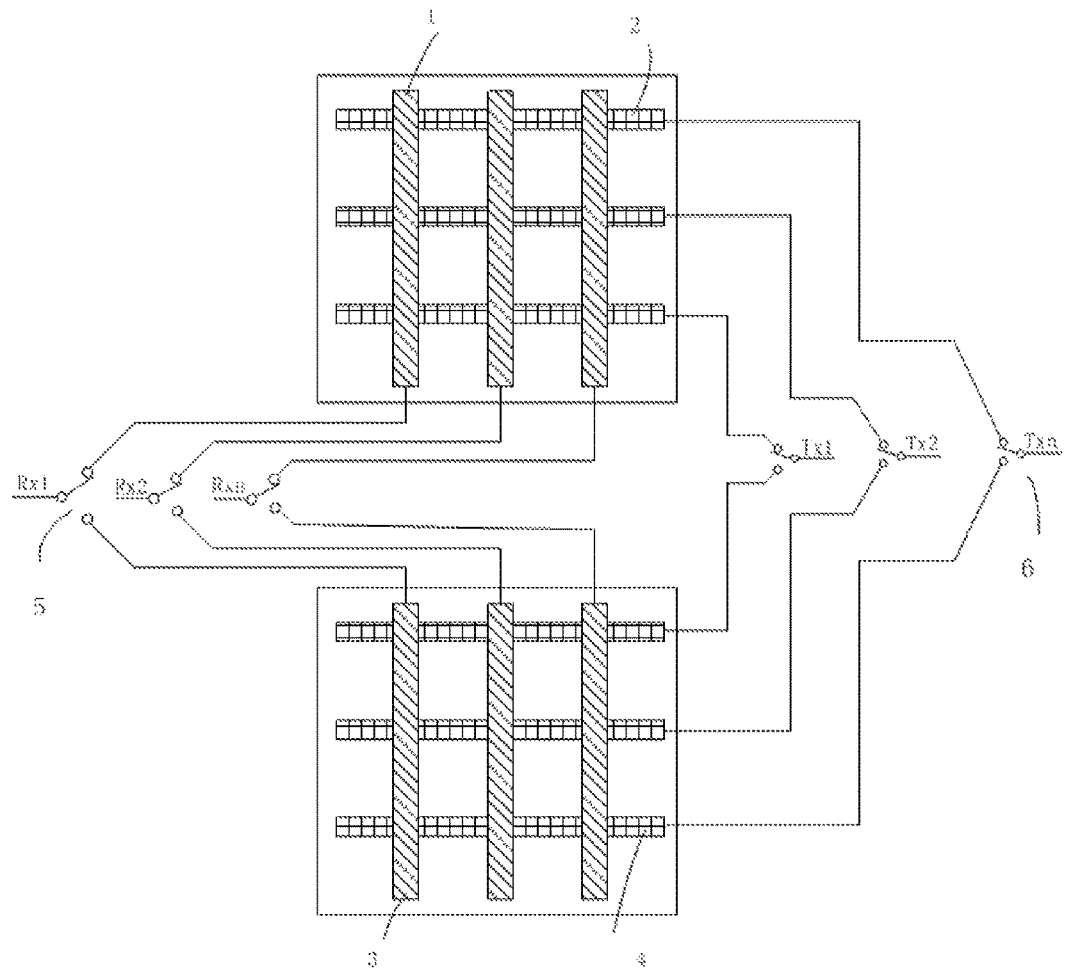
FIG. 2 is a schematic diagram of a structure of a touch control mechanism according to Embodiment 1 of the present invention.

In this embodiment, as shown in FIG. 2, the first sensing electrodes 1 and the first driving electrodes 2 are in the shape of stripe, and are arranged perpendicular to and intersecting with each other. The second sensing electrodes 3 and the second driving electrodes 4 are in the shape of stripe, and are arranged perpendicular to and intersecting with each other. When touch control is performed on the first side of the double-sided touch control substrate, the first change-over switches 5 are connected to the first sensing electrodes 1 and the second change-over switches 6 are connected to the first driving electrodes 2, so that the touch-control function of the first side is implemented. When touch control is performed on the second side of the double-sided touch control substrate, the first change-over switches 5 are connected to the second sensing electrodes 3 and the second change-over switches 6 are connected to the second driving electrodes 4, so that the touch-control function of the second side is implemented.

In this embodiment, the touch control mechanism may be configured as any structure of add on mode, on cell mode and in cell mode with respect to the base 7. In practical application, this may be flexibly selected according to requirement of application situation and customer requirement, and is not limited herein.

Optionally, in the first touch control mechanism, the first sensing electrodes 1 and the first driving electrodes 2 are both arranged inside the first side, so as to form an in cell structure; alternatively, the first sensing electrodes 1 and the first driving electrodes 2 are both arranged outside the first side, so as to form a add on mode structure or on cell structure; alternatively, the first sensing electrodes 1 are arranged outside the first side, and the first driving electrodes 2 are arranged inside the first side. Optionally, in the second touch control mechanism, the second sensing electrodes 3 and the second driving electrodes 4 are both arranged inside the second side, so as to form an in cell structure; alternatively, the second sensing electrodes 3 and the second driving electrodes 4 are both arranged outside the second side, so as to form a add on mode structure or on cell structure; alternatively, the second sensing electrodes 3 are arranged outside the second side, and the second driving electrodes 4 are arranged inside the second side.

Preferably, in the process of touch control, length of touch control time for the first sensing electrodes 1 and the first driving electrodes 2 of the double-sided touch control substrate may be the same as that for the second sensing electrodes 3 and the second driving electrodes 4 thereof, in order to simplify driving program. Here, the length of touch control time refers to the time taken by the touch control mechanism to detect and determine a position of a touch point and perform a command corresponding to the position of the touch point in the process of obtaining, by the first or second side, a touch control signal.

The double-sided touch control substrate may be applied in various occasions with control needs in daily life, and because the touch control mechanisms of both sides of the base share one touch control driving unit, a streamlined touch-control device that is not limited to single-sided touch control is implemented by using fewer resources, and resource utilization rate is higher.

Embodiment 2

This embodiment provides a double-sided substrate, which differs from Embodiment 1 in that, the patterns of the sensing electrodes and driving electrodes in the first and second touch control mechanisms in this embodiment are different from those of the sensing electrodes and driving electrodes in the first and second touch control mechanisms in Embodiment 1.

Figure 3:
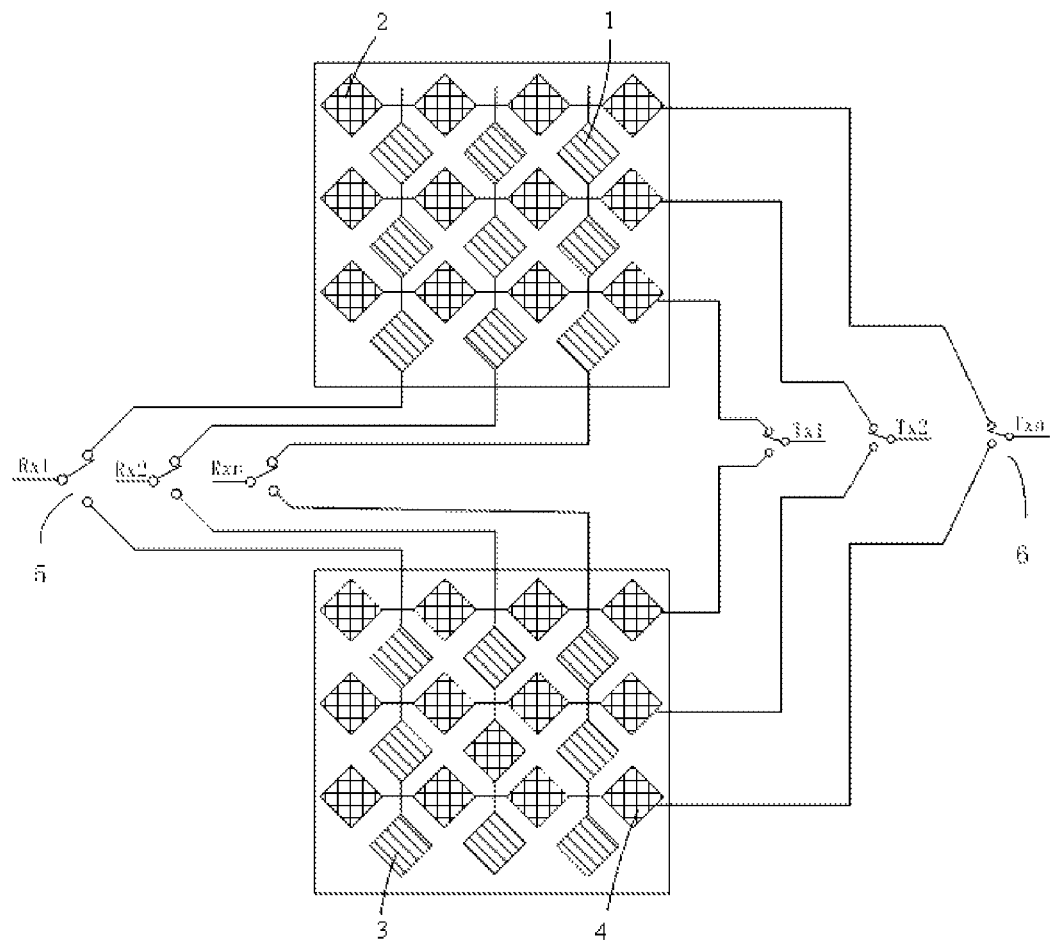
FIG. 3 is a schematic diagram of a structure of a touch control mechanism according to Embodiment 2 of the present invention.

In this embodiment, the sensing electrodes and the driving electrodes are set to be in the shape of rhombus. As shown in FIG. 3, the first sensing electrodes 1 and the first driving electrodes 2 are in the shape of rhombus; the second sensing electrodes 3 and the second driving electrodes 4 are in the shape of rhombus. In this case, both the plurality of the first sensing electrodes 1 and the plurality of the first driving electrodes 2 are arranged in arrays, wherein columns of the array formed by the plurality of the first sensing electrodes 1 and rows of the array formed by the plurality of the first driving electrodes 2 are perpendicular to and intersecting with each other. Referring to FIG. 3 again, a plurality of first sensing electrodes 1 arranged in the same column are connected to the same sensing signal line Rx, and a plurality of first driving electrodes 2 arranged in the same row are connected to the same driving signal line Tx. Structures of the second sensing electrodes 3 and the second driving electrodes 4 are the same as those of the first sensing electrodes 1 and the first driving electrodes 2, and are not repeated herein.

The working principle of the double-sided touch control substrate is the same as that of the double-sided touch control substrate having strip-shaped sensing and driving electrodes in Embodiment 1, and is not described in detail herein. Other structures of the double-sided touch control substrate in this embodiment are the same as the corresponding structures of the double-sided touch control substrate in Embodiment 1, and are not described in detail herein.

It can be understood that, although the first sensing electrodes 1 and driving electrodes 2 in the first touch control mechanism have the same structures as the second sensing electrodes 3 and driving electrodes 4 in the second touch control mechanism in FIGS. 2 and 3, the present invention is not limited thereto. The first sensing electrodes 1 and driving electrodes 2 in the first touch control mechanism may have different structures from the second sensing electrodes 3 and driving electrodes 4 in the second touch control mechanism, for example, the first sensing electrodes 1 and driving electrodes 2 in the first touch control mechanism may be stripe-shaped electrodes (as shown in FIG. 2), whereas the second sensing electrodes 3 and driving electrodes 4 in the second touch control mechanism may be rhombus-shaped (as shown in FIG. 3).

The double-sided touch control substrate may be applied in various occasions with control needs in daily life, and because the touch control mechanisms of both sides of the base share one touch control driving unit, a streamlined touch-control device that is not limited to single-sided touch control is implemented by using fewer resources, and resource utilization rate is higher.

Embodiment 3

This embodiment provides a double-sided touch control device, which comprises the double-sided touch control substrate in Embodiment 1 or 2. With the double-sided touch control device, touch control operation from both opposite sides of the base can be achieved, and as the touch control mechanisms arranged at both sides of the base share the touch control driving unit, resource sharing is achieved and structure of the double-sided touch control device is simplified.

Here, both sides of the base can display images, for example, the base is a transparent display panel or a double-sided display panel, and can perform dual view control so as to perform bidirectional touch control. Alternatively, only one side of the base can display images, for example, the base is a hand-held single-sided mobile phone panel with a large screen, and control of the image-display side can be achieved at the non-image-display side, that is, positioning and touch control operations of a large image such as a map can be achieved through backside touch without blocking the displayed image by a finger. Alternatively, both sides of the base cannot display images, but only provide touch control function, for example, building control that can be respectively controlled indoors or outdoors, temperature control for room heating and embedded in a common wall of adjacent rooms at home, or the like.

In the double-sided touch control device in this embodiment, the first sensing and driving electrodes are provided at one side of the base and second sensing and driving electrodes are provided at the other side of the base, switching between connections of the first sensing electrodes and the second sensing electrodes to the sensing signal lines Rx is implemented by the first change-over switches, switching between connections of the first driving electrodes and the second driving electrodes to the driving signal lines Tx is implemented by the second change-over switches, thereby achieving the function of double-sided touch control. As the function of double-sided touch control is achieved by sharing one touch control driving unit (or driving IC), resource utilization rate is higher and cost of a touch control device is lower.

Embodiment 4

This embodiment provides a double-sided touch control display device, comprising the double-sided touch control substrate in Embodiment 1 or 2.

In the double-sided touch control display device in this embodiment, optionally, the base is a liquid crystal display panel and the double-sided touch control display device is a liquid crystal display device; or the base is an organic light-emitting diode display panel, and the double-sided touch control display device is an organic light-emitting diode display device, which can bring better touch control experience over the conventional flat panel display.

Optionally, the base is a double-sided display panel, and the double-sided touch control display device is a double-sided display device; or the base is a transparent display panel, and the double-sided touch control display device is a transparent display device, which can bring infinitely extendable visual-spatial enjoyment to users, and has no heavy feeling visually.

Optionally, the base is a non-flexible display panel, and the double-sided touch control display device is a non-flexible display device; or the base is flexible display panel, and the double-sided touch control display device is a flexible display device, which can implement flexible curved display and bring a new visual experience to users.

Optionally, in the double-sided touch control display device, the sensing electrodes and the driving electrodes may be directly manufactured on the upper surface and lower surface of the base, respectively; alternatively, the sensing electrodes and the driving electrodes may be provided on a flexible thin film or a flexible substrate, and then are attached to the upper surface and lower surface of the base through an optical adhesive (OCA).

The touch control detecting principle of the double-sided touch control display device in this embodiment is described as follows. The touch control driving unit detects voltage signals on the touch control sensing signal lines Rx generated by coupling of sensing capacitors while supplying touch control driving signals to the driving signal lines Tx. In this process, when a human body comes into contact with the touch panel, human electric field will act on the sensing capacitor, so as to change the capacitance value of the sensing capacitor, which in turn changes the voltage signal on the sensing signal line Rx generated by coupling of the sensing capacitor, and the position of a touch point can be determined based on the change in the voltage signal. Specifically, when detecting the first side, the first change-over switches connect the first sensing electrodes to the sensing signal lines Rx, and the second change-over switches connect the first driving electrodes to the driving signal lines Tx, so that the position of a touch point by a human body at the first side is determined. After detection of the first side is completed, the first change-over switches connect the second sensing electrodes to the sensing signal lines Rx, and the second change-over switches connect the second driving electrodes to the driving signal lines Tx, so as to continue with the detection on the second side, so that the position of a touch point by a human body at the second side is determined. By repetitive switch, double-sided touch control function is realized.

For the structure and the touch control and display principles of the double-sided touch control display device, they are described in detail by taking a case in which the base is a double-sided display panel as an example. In this double-sided display and double-sided touch control display device, the first sensing electrodes and the first driving electrodes are provided at one side of the base, the second sensing electrodes and the second driving electrodes are provided at the other side of the base, switching between connections of the first sensing electrodes and the second sensing electrodes to the sensing signal lines Rx is implemented by the first change-over switches, switching between connections of the first driving electrodes and the second driving electrodes to the driving signal lines Tx is implemented by the second change-over switches, thereby achieving the function of double-sided touch control, and as the function of double-sided touch control is achieved by sharing one touch control driving unit (or driving IC), resource utilization rate is higher.

In order to achieve both good display effect and good touch control effect, in the double-sided display and double-sided touch control device of this embodiment, the length of touch control time for the first sensing electrodes and the first driving electrodes is smaller than the length of display time for the first side, and the sum of the length of touch control time and the length of display time is equal to a frame period; and/or, the length of touch control time for the second sensing electrodes and the second driving electrodes is smaller than the length of display time for the second side, and the sum of the length of touch control time and the length of display time is equal to the frame period. Here, the length of touch control time refers to the time taken by the touch control mechanism to detect and determine a position of a touch point and perform a command corresponding to the position of the touch point, in one frame period; the length of display time refers to the time taken by the base to display an image under the drive of a display driving unit, in one frame period.

Preferably, the frame period of the first side is equal to the frame period of the second side, for example, frame frequency of the double-sided display and double-sided touch control device may be 1/60 Hz, and in this case, for each of the first side and the second side, the frame period for displaying one frame of image is 16.7 ms. In order not to influence the display function of the double-sided touch control display device in the touch control process thereof, one frame period is divided into a display time and a touch control time, which are time division controlled. For example, in a case where the frame period of the double-sided display and double-sided touch control is 16.7 ms, 4 ms therein may serve as the touch control time and the remaining 12.7 ms may serve as the display time. Of course, the lengths of the touch control time and the display time may be adjusted properly according to processing ability of the touch control driving unit (driving IC chip), and are not specifically limited herein.

In the double-sided touch control display device in this embodiment, the first sensing electrodes and the first driving electrodes are provided at one side of the base and the second sensing electrodes and the second driving electrodes are provided at the other side of the base, switching between connections of the first sensing electrodes and the second sensing electrodes to the sensing signal lines Rx is implemented by the first change-over switches, and switching between connections of the first driving electrodes and the second driving electrodes to the driving signal lines Tx is implemented by the second change-over switches, thereby achieving the function of double-sided touch control. As the function of double-sided touch control is achieved by sharing one touch control driving unit (or driving IC), compared to the existing double-sided touch control display device implemented by combining single-sided touch control display panels, a set of touch control driving unit is saved, and thus resource utilization rate is higher and cost of the touch control device is lower.

In the double-sided touch control substrate and the double-sided touch control device comprising the double-sided touch control substrate in the present invention, the first touch control mechanism and the second touch control mechanism that are respectively arranged at both sides of the base are switched and connected to the touch control driving unit through the switching mechanism; and particularly, when they are applied in the double-sided touch control display device in the display field, by adopting time division control of display and touch control, the purpose of double-sided touch control is achieved, and the two touch control mechanisms that can implement touch control functions separately are set to share one touch control driving unit, as a result, a streamlined touch-control device that is not limited to single-sided touch control is implemented by using fewer resources, and thus resource utilization rate is higher and cost of the touch control device is lower.

It could be understood that the above implementations are only exemplary implementations for illustrating the principle of the present invention, but the present invention is not limited thereto. Various variations and improvements can be made by those skilled in the art without departing from the spirit and essence of the present invention, and these variations and improvements are also considered to be within the protection scope of the present invention.

The invention claimed is:
1. A double-sided touch control substrate, comprising:
  a base having a first side and a second side opposite to each other;
  a first touch control mechanism provided on the first side;
  a second touch control mechanism provided on the second side;
  a touch control driving unit, wherein the touch control driving unit is provided with a sensing signal line and a driving signal line; and
  a switching mechanism,
  wherein the first touch control mechanism and the second touch control mechanism are only connected to the switching mechanism directly, both the first touch control mechanism and the second touch control mechanism are connected to the touch control driving unit through the switching mechanism, and the switching mechanism is configured to switch the first touch control mechanism and the second touch control mechanism such that the first touch control mechanism and the second touch control mechanism are connected to the touch control driving unit in a time-sharing manner,
  wherein the first touch control mechanism comprises a first sensing electrode and a first driving electrode, and the second touch control mechanism comprises a second sensing electrode and a second driving electrode; and
  wherein the switching mechanism comprises:
    a first change-over switch, which is connected to the sensing signal line, the first sensing electrode and the second sensing electrode; and
    a second change-over switch, which is connected to the driving signal line, the first driving electrode and the second driving electrode, the first change-over switch and the second change-over switch are configured to switch between the first sensing electrode and the second sensing electrode to connect the first sensing electrode or the second sensing electrode to the sensing signal line, and configured to switch between the first driving electrode and the second driving electrode to connect the first driving electrode or the second driving electrode to the driving signal line, respectively, such that the first touch control mechanism and the second touch control mechanism separately provided on the first and second sides are controlled in the time-sharing manner.

2. The double-sided touch control substrate according to claim 1, wherein, the touch control driving unit is provided with a plurality of the sensing signal lines and a plurality of the driving signal lines, the switching mechanism comprises a plurality of the first change-over switches and a plurality of the second change-over switches, the first touch control mechanism comprises a plurality of the first sensing electrodes and a plurality of the first driving electrodes, the second touch control mechanism comprises a plurality of the second sensing electrodes and a plurality of the second driving electrodes, the first change-over switches are provided correspondingly to the sensing signal lines, the first sensing electrodes and the second sensing electrodes, and the second change-over switches are provided correspondingly to the driving signal lines, the first driving electrodes and the second driving electrodes; and each first change-over switch is connected to the corresponding sensing signal line, and is configured to switch between the corresponding first sensing electrode and the corresponding second sensing electrode to connect the corresponding first or second sensing electrode to the corresponding sensing signal line; each second change-over switch is connected to the corresponding driving signal line, and is configured to switch between the corresponding first driving electrode and the corresponding second driving electrode to connect the corresponding first or second driving electrode to the corresponding driving signal line.

3. The double-sided touch control substrate according to claim 2, wherein, the first sensing electrodes and the first driving electrodes are in the shape of stripe, and are arranged perpendicular to and intersecting with each other; the second sensing electrodes and the second driving electrodes are in the shape of stripe, and are arranged perpendicular to and intersecting with each other.

4. The double-sided touch control substrate according to claim 3, wherein, in the first touch control mechanism, the first sensing electrodes and the first driving electrodes are both arranged inside the first side; or the first sensing electrodes and the first driving electrodes are both arranged outside the first side; or the first sensing electrodes are arranged outside the first side, while the first driving electrodes are arranged inside the first side; and in the second touch control mechanism, the second sensing electrodes and the second driving electrodes are both arranged inside the second side; or the second sensing electrodes and the second driving electrodes are both arranged outside the second side; or the second sensing electrodes are arranged outside the second side, while the second driving electrodes are arranged inside the second side.

5. The double-sided touch control substrate according to claim 4, wherein, length of touch control time for the first sensing electrodes and the first driving electrodes is the same as that for the second sensing electrodes and the second driving electrodes.

6. The double-sided touch control substrate according to claim 3, wherein, length of touch control time for the first sensing electrodes and the first driving electrodes is the same as that for the second sensing electrodes and the second driving electrodes.

7. The double-sided touch control substrate according to claim 2, wherein, the first sensing electrodes and the first driving electrodes are in the shape of rhombus, both the first sensing electrodes and the first driving electrodes are arranged in arrays, and columns of the array formed by the first sensing electrodes and rows of the array formed by the first driving electrodes are perpendicular to and intersecting with each other; the second sensing electrodes and the second driving electrodes are in the shape of rhombus, both the second sensing electrodes and the second driving electrodes are arranged in arrays, and columns of the array formed by the second sensing electrodes and rows of the array formed by the second driving electrodes are perpendicular to and intersecting with each other.

8. The double-sided touch control substrate according to claim 7, wherein, in the first touch control mechanism, the first sensing electrodes and the first driving electrodes are both arranged inside the first side; or the first sensing electrodes and the first driving electrodes are both arranged outside the first side; or the first sensing electrodes are arranged outside the first side, while the first driving electrodes are arranged inside the first side; and
  in the second touch control mechanism, the second sensing electrodes and the second driving electrodes are both arranged inside the second side; or the second sensing electrodes and the second driving electrodes are both arranged outside the second side; or the second sensing electrodes are arranged outside the second side, while the second driving electrodes are arranged inside the second side.

9. The double-sided touch control substrate according to claim 7, wherein, length of touch control time for the first sensing electrodes and the first driving electrodes is the same as that for the second sensing electrodes and the second driving electrodes.

10. The double-sided touch control substrate according to claim 2, wherein, length of touch control time for the first sensing electrodes and the first driving electrodes is the same as that for the second sensing electrodes and the second driving electrodes.

11. The double-sided touch control substrate according to claim 1, wherein, length of touch control time for the first sensing electrodes and the first driving electrodes is the same as that for the second sensing electrodes and the second driving electrodes.

12. A double-sided touch control device, comprising a double-sided touch control substrate, wherein the double-sided touch control substrate comprises:
  a base having a first side and a second side opposite to each other;
  a first touch control mechanism provided on the first side;
  a second touch control mechanism provided on the second side;
  a touch control driving unit, wherein the touch control driving unit is provided with a sensing signal line and a driving signal line; and
  a switching mechanism,
  wherein the first touch control mechanism and the second touch control mechanism are only connected to the switching mechanism directly, both the first touch control mechanism and the second touch control mechanism are connected to the touch control driving unit through the switching mechanism, and the switching mechanism is configured to switch the first touch control mechanism and the second touch control mechanism such that the first touch control mechanism and the second touch control mechanism are connected to the touch control driving unit in a time-sharing manner,
  wherein the first touch control mechanism comprises a first sensing electrode and a first driving electrode, and the second touch control mechanism comprises a second sensing electrode and a second driving electrode,
  wherein the switching mechanism comprises:
  a first change-over switch, which is connected to the sensing signal line, the first sensing electrode and the second sensing electrode; and
  a second change-over switch, which is connected to the driving signal line, the first driving electrode and the second driving electrode,
  the first change-over switch and the second change-over switch are configured to switch between the first sensing electrode and the second sensing electrode to connect the first sensing electrode or the second sensing electrode to the sensing signal line, and configured to switch between the first driving electrode and the second driving electrode to connect the first driving electrode or the second driving electrode to the driving signal line, respectively, such that the first touch control mechanism and the second touch control mechanism separately provided on the first and second sides are controlled in the time-sharing manner.

13. A double-sided touch control display device, comprising a double-sided touch control substrate, wherein the double-sided touch control substrate comprises:
  a base having a first side and a second side opposite to each other;
  a first touch control mechanism provided on the first side;
  a second touch control mechanism provided on the second side;
  a touch control driving unit, wherein the touch control driving unit is provided with a sensing signal line and a driving signal line; and
  a switching mechanism,
  wherein the first touch control mechanism and the second touch control mechanism are only connected to the switching mechanism directly, both the first touch control mechanism and the second touch control mechanism are connected to the touch control driving unit through the switching mechanism, and the switching mechanism is configured to switch the first touch control mechanism and the second touch control mechanism such that the first touch control mechanism and the second touch control mechanism are connected to the touch control driving unit in a time-sharing manner,
  wherein the first touch control mechanism comprises a first sensing electrode and a first driving electrode, and the second touch control mechanism comprises a second sensing electrode and a second driving electrode,
  wherein the switching mechanism comprises:
  a first change-over switch, which is connected to the sensing signal line, the first sensing electrode and the second sensing electrode; and a second change-over switch, which is connected to the driving signal line, the first driving electrode and the second driving electrode, the first change-over switch and the second change-over switch are configured to switch between the first sensing electrode and the second sensing electrode to connect the first sensing electrode or the second sensing electrode to the sensing signal line, and configured to switch between the first driving electrode and the second driving electrode to connect the first driving electrode or the second driving electrode to the driving signal line, respectively, such that the first touch control mechanism and the second touch control mechanism separately provided on the first and second sides are controlled in the time-sharing manner.

14. The double-sided touch control display device according to claim 13, wherein the base is a liquid crystal panel, an organic light-emitting diode display panel, a double-sided display panel, a transparent display panel, a flexible display panel or a non-flexible display panel.

15. The double-sided touch control display device according to claim 13, wherein, the length of touch control time for the first sensing electrodes and the first driving electrodes is smaller than length of display time for the first side, and the sum of the length of touch control time and the length of display time is equal to a frame period; and/or, the length of touch control time for the second sensing electrodes and the second driving electrodes is smaller than length of display time for the second side, and the sum of the length of touch control time and the length of display time is equal to the frame period.

* * * * *